March 10, 1953 F. R. ELLENBERGER 2,630,868
PLASTIC ROTOR BLADE
Filed Oct. 29, 1949
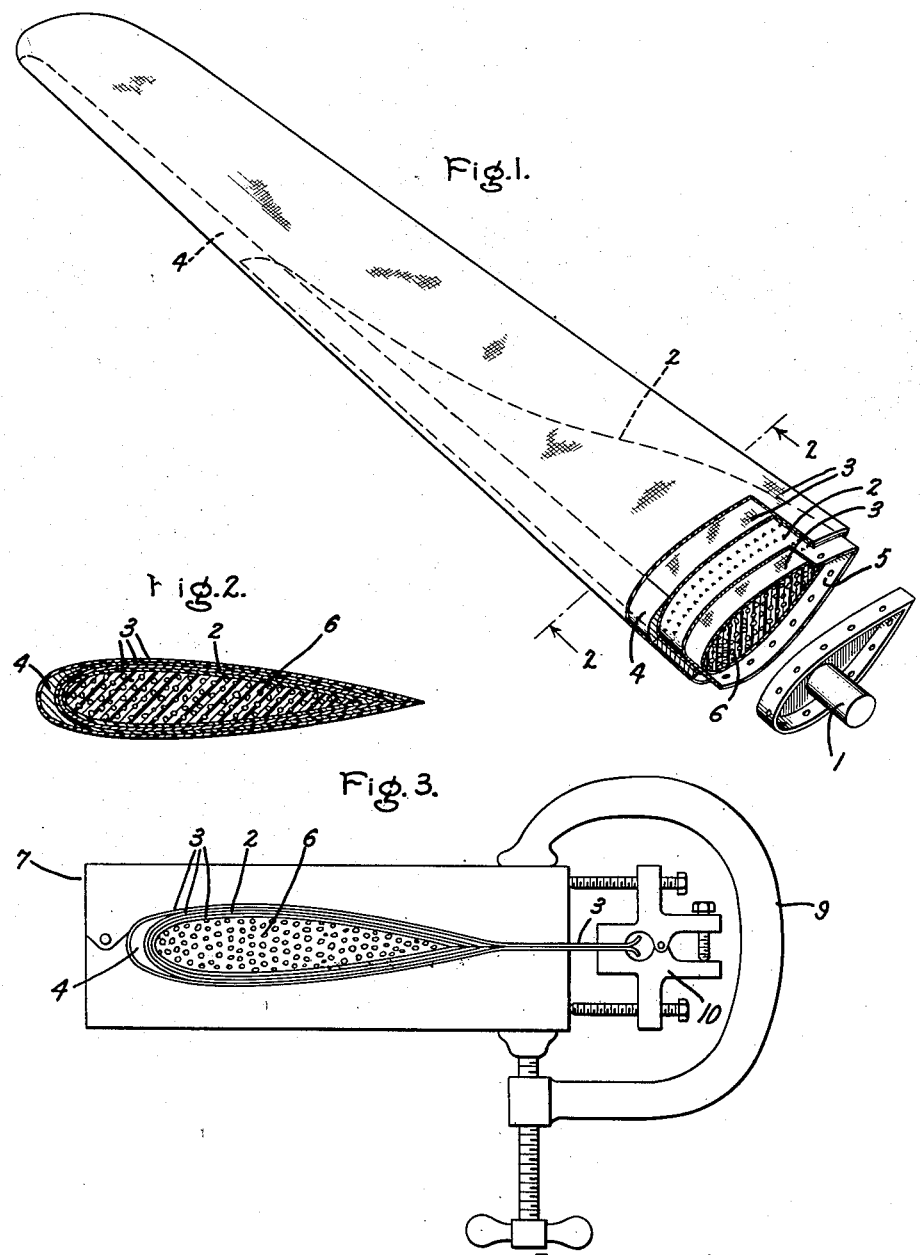
Inventor:
Francis R. Ellenberger,
by Abraham Cohen
His Attorney, Patented Mar. 10, 1953

2,630,868

UNITED STATES PATENT OFFICE 2,630,868

PLASTIC ROTOR BLADE

Francis R. Ellenberger, Cedar Grove, N. J., assignor to General Electric Company, a corporation of New York Application October 29, 1949, Serial No. 124,312

2 Claims. (Cl. 170—159)

My invention relates to aircraft sustaining rotor blades. While the invention is applicable to airfoils generally, the invention is particularly concerned with rotative airfoils, and more especially with blades of aircraft sustaining rotors.

In the ordinary type of aircraft sustaining rotor blade, there is incorporated into the structure a longitudinal spar which may or may not be in combination with transverse ribs. To eliminate the expense and difficulties involved in building blades having longitudinal spars and transverse ribs, a rotor blade is desired which requires less skill in manufacturing, is relatively inexpensive, is reproducible to a high degree and has more strength than the ordinary type of rotor blade.

It is, therefore, an object of my invention to provide a rotor blade shaped entirely of a cellular plastic material and without longitudinal spars or transverse ribs.

It is a further object of my invention to provide a method of producing the desired airfoil by the use of relatively simple means and inexpensive tools.

It is a still further object of my invention to provide a rotor blade in which the outer skin is designed to carry nearly all the stresses to which the rotor blade is subjected, the skin being filled with relatively weak cellular plastic material to keep the skin from collapsing in bending and to maintain correct cross-sectional contour.

In accordance with one feature of my invention, I provide an improved method of constructing rotor blades which consists in forming by extrusion, molding or machining a piece of cellular cellulose material into a section of the desired airfoil shape, wrapping it with cloth impregnated with phenolic compound, clamping it in a mold, and curing in an autoclave.

The features of my invention which I believe to be novel are set forth with particularity in the appended claims. My invention, itself, however, both as to its organization and method of operation, together with further objects and advantages thereof, may be best understood by reference to the following description taken in connection with the accompanying drawing in which Fig. 1 is a perspective view of the rotor blade of my invention; Fig. 2 is a cross-sectional view of the rotor blade along the line 2—2; and Fig. 3 is a mold for constructing the airfoil illustrated in Figs. 1 and 2.

Referring particularly to Fig. 1, there is shown the rotor blade of my invention comprising a hub attachment device 1 fitted into the center piece of the central hub restraining device (not shown), a metal boot 2 inserted between layers of cloth 3 and providing a means of attaching the rotor blade to the hub mechanism 1. The metal boot 2, preferably having a perforated or roughened surface to obtain greater shearing traction with the cloth, transfers the tensile force to the cloth covering and provides a means of strengthening the leading edge and concentrating greater weight at this location where quarter-chord balancing is desirable.

The requirement that the center of gravity be at the approximate 25 per cent chord is necessitated by aerodynamic and control stability. When an airfoil section moves through the air, the result of all lift and drag forces can be considered to act upon a single point known as the center of pressure which varies with the angle of attack of the airfoil. It is a point forward of this center of pressure, located normally at about the 25 per cent chord, that is known as the aerodynamic center. At this fixed point the pitching movement (equal to the resultant force times the distance to the center of pressure) is found to be nearly constant for all angles of attack. When rotary wing aircraft are in forward flight, the angle of attack and lift and drag forces are changing once per revolution of the rotor, causing each individual blade to vibrate up and down once per revolution. If the blades are not supported at the 25 per cent point and if the cross-sectional center of gravity is not at this point, unstable dynamic forces are set up once per revolution causing each blade to twist. Hinging each blade on an axis through its aerodynamic center obviates this stability problem and permits a constant control force for adjusting the angle of attack of each blade. In effecting the required balances, the metal boot 2 is supplemented by a solid metal bar 4 placed at the leading edge of the airfoil. A boot extension device 5, which is located at the inner end of the cellular core 6, is welded to the boot 2 and gives additional support thereto. (Parts 2 and 5 can also be combined into a common piece.)

The desired airfoil shape is obtained by use of the apparatus shown in Fig. 3. A cellular core 6 is formed or machined to the type and size desired and is covered with a phenolic impregnated cloth 3, both the foam core 6 and cloth covering 3 being incased in a mold 7 having a hinged section and means for compressing the hinged section 9. A tension device 10 shapes the cloth covering to the cellular core 6 which is made oversize to provide the necessary compression when the cloth 3 is placed between the cellular core 6 and the mold 7. As many layers of cloth as desired may be used. The made core and covering are then cured together, preferably in an autoclave, to form an integral unit.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an airfoil, a supporting cellular core material incased in a multi-layer covering, means for attaching said covering and core to a central restraining mechanism, and a balancing piece for positioning the center of gravity of said airfoil, said attaching means comprising a boot of solid material embedded between layers of said covering and a hub attachment device connected to said boot and forming the base of said airfoil.

2. In an airfoil, supporting core material incased in a multi-layer covering, means for attaching said covering and core to a central restraining mechanism, and a balancing piece for positioning the center of gravity of said airfoil, said attaching means comprising a boot of solid material embedded between layers of said covering and said core material, and a hub attachment device connected to said boot and forming the base of said airfoil.

FRANCIS R. ELLENBERGER.

REFERENCES CITED

The following references are of record in the file of this patent:

UNITED STATES PATENTS

| Number | Name | Date |
| --- | --- | --- |
| 2,111,975 | Larsen et al. | Mar. 22, 1938 |
| 2,175,204 | Lougheed | Oct. 10, 1939 |
| 2,182,812 | Lougheed | Dec. 12, 1939 |
| 2,202,042 | Blount | May 28, 1940 |
| 2,272,439 | Stanley et al. | Feb. 10, 1942 |
| 2,361,438 | Turner | Oct. 31, 1944 |
| 2,407,867 | Buchanan | Sept. 17, 1946 |
| 2,426,400 | Lampton et al. | Aug. 26, 1947 |
| 2,428,970 | Hardy | Oct. 14, 1947 |
| 2,429,122 | Crowley | Oct. 14, 1947 |
| 2,484,141 | Alex | Oct. 11, 1949 |

FOREIGN PATENTS

| Number | Country | Date |
| --- | --- | --- |
| 124,253 | Great Britain | Mar. 13, 1919 |